2 Sheets—Sheet 1.

G. S. WHITE & G. W. CALEF.
Mower.

No. 226,216. Patented April 6, 1880.

Witnesses:

Inventors:
Geo. S. White
and Geo. W. Calef
Per T. H. Alexander Elliott
Attorneys.

2 Sheets—Sheet 2.
G. S. WHITE & G. W. CALEF.
Mower.
No. 226,216. Patented April 6, 1880.
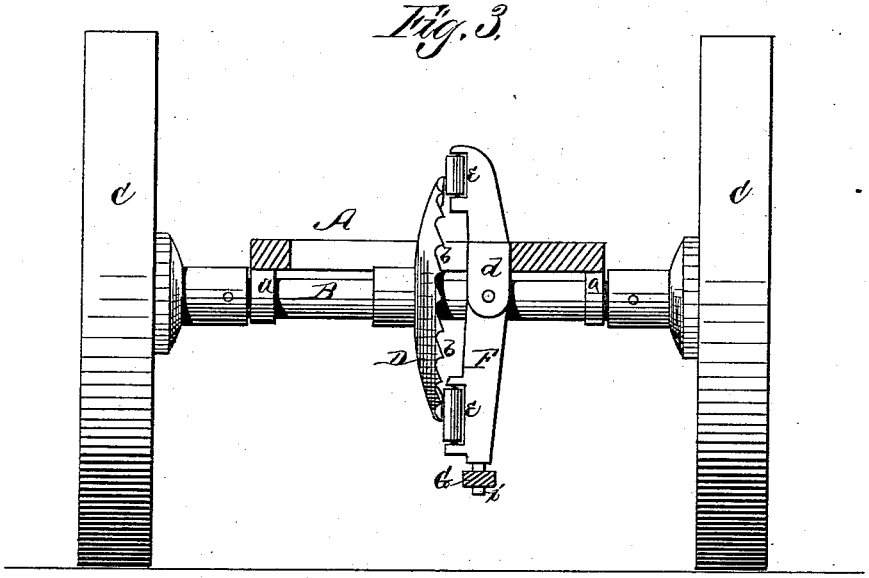
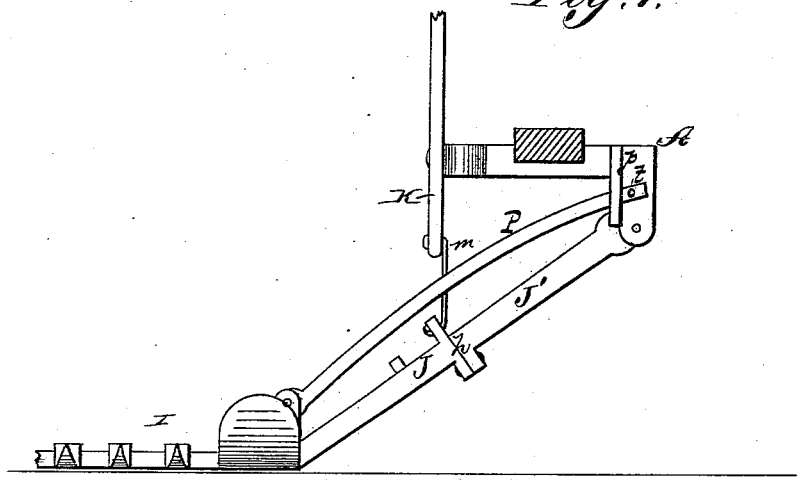
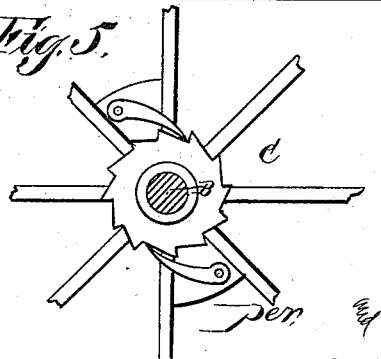
Witnesses:
H. C. McArthur
John C. Rogers
Inventors
Geo. S. White
Geo. W. Calef
T. Alexander Elliott
Attorneys

UNITED STATES PATENT OFFICE.

GEORGE S. WHITE AND GEORGE W. CALEF, OF EDDINGTON, MAINE.

MOWER.

SPECIFICATION forming part of Letters Patent No. 226,216, dated April 6, 1880.

Application filed November 28, 1879.

*To all whom it may concern:*

Be it known that we, GEO. S. WHITE and GEO. W. CALEF, of Eddington, in the county of Penobscot and State of Maine, have invented certain new and useful Improvements in Mowers; and we do hereby declare that the following is a full, clear, and exact description thereof, reference being had to the accompanying drawings, and to the letters of reference marked thereon, which form part of this specification.

The nature of our invention relates to improvements in mowing-machines, as will be hereinafter more fully set forth, and pointed out in the claims.

In order to enable others skilled in the art to which our invention appertains to make and use the same, we will now proceed to describe its construction and operation, referring to the annexed drawings, in which—

Figure 1:
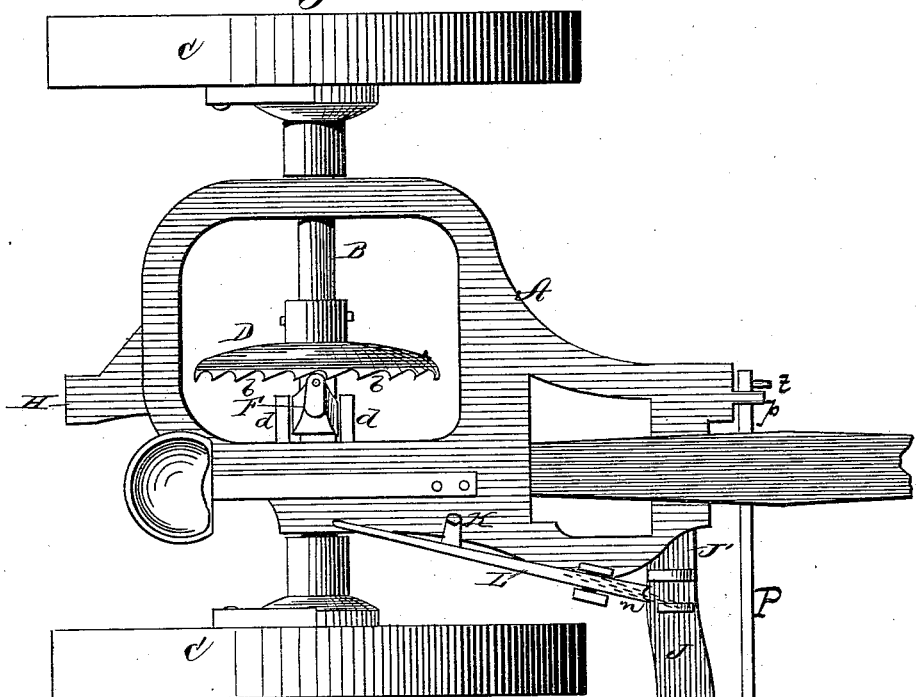
Figure 2:
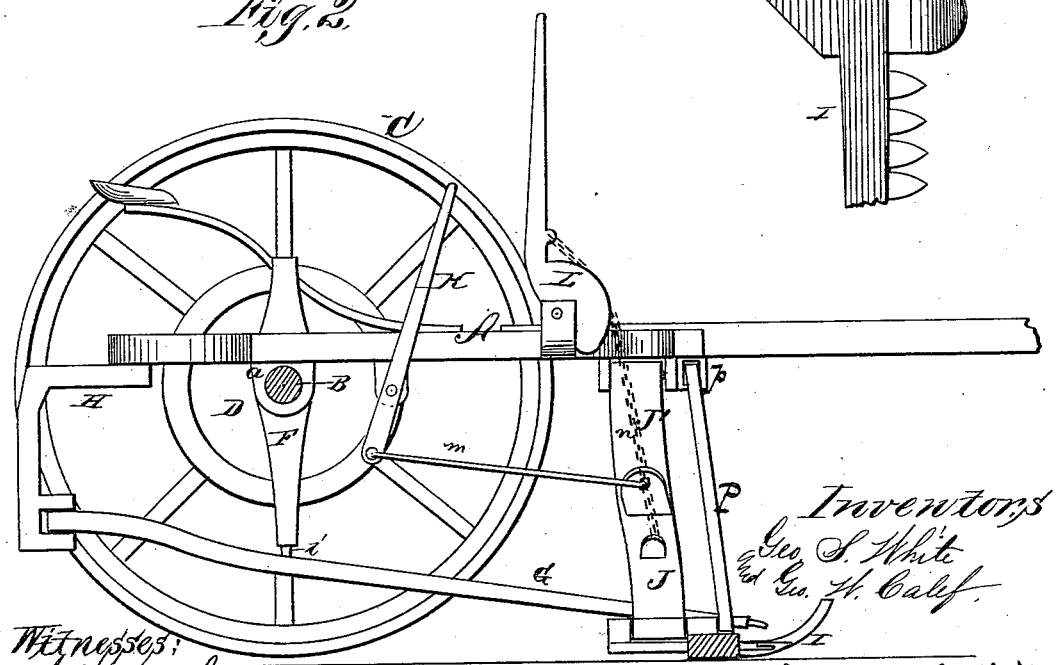

Figure 1 is a plan view; Fig. 2, an end view with one wheel removed.; Fig. 3, a rear elevation, partly in section; Fig. 4, a detailed front view, and Fig. 5 a detail of the ratchets.

A represents the frame of the mower, provided with suitable boxes *a a*, in which the axle B rotates. This axle is on each end provided with a driving-wheel, C, placed loosely thereon and connected to it by ordinary pawl and ratchet, so that the axle will turn with the wheels when moving forward; but if either wheel turns backward, as in turning at the ends of the field, the axle will not be turned backward.

On the axle B is secured a wheel or disk, D, one face of which has at the rim a series of flutes, *b b*, of equal size, at equal distances apart, and extending radially on the wheel.

In lugs *d d* on the frame A is pivoted an upright post, F, which is slotted in the middle, so that the axle passes through it, and the post extends a suitable distance above and below the axle. In each end of the post F is mounted a friction-roller, *e*, and the fluted surfaces of the disk D work against said rollers, so as to rock the post continuously on its pivots.

The lower end of the post F is formed or provided with a pin, *i*, which enters a hole in a lever, G. The rear end of this lever is pivoted in a hanger, H, depending from the rear of the frame. The front end of the lever is to be connected to the knife-bar of the machine, and as the post F is rocked, as above described, the lever obtains a laterally-reciprocating motion on its rear pivot, giving the necessary movement to the knife-bar.

It will be noticed from the above construction that the lever works on a level with the knife, making less friction in the knife and less wear in the knife-head.

I represents the finger-bar of the mower, which is hinged to one end of a coupling-arm, and the other end of this arm is hinged to the forward part of the mower-frame. This coupling-arm is made in two parts, J and J', as shown, which parts are swiveled together at *h*, thereby admitting of the finger-bar being rocked or turned on the ground, so as to throw the points of the fingers higher or lower as desired. This is accomplished by means of a lever, K, pivoted to the frame and connected to the outer part, J, of the coupling-arm by a rod, *m*.

The finger-bar is lifted up from the ground by means of a cam-lever, L, connected to the coupling-arm by a chain, *n*. At the inner hinged end of the finger-bar I is also hinged a rod, P, which extends inward and passes through a vertically-slotted projection or guide, *p*, attached to or formed on the forward end of the mower-frame. A pin, *t*, is inserted in the inner end of this rod, which prevents the same from passing out of the guide *p*, while it forms no impediment to the raising of the finger-bar. Neither does the rod P prevent the tilting of the finger-bar, but it acts as a brace to strengthen and support the finger-bar while the mower is in operation. If desired, the pin *t* may be adjustable in the rod P, so as to regulate and hold the inner end of the finger-bar at varying distances from the ground.

Having thus fully described our invention, what we claim as new, and desire to secure by Letters Patent, is—

1. In a mowing-machine, the combination of the fluted disk D, the pivoted post F, straddling the axle and provided with rollers *e e*, and the pivoted lever G, said lever being arranged to vibrate on the same plane with that of the knife-bar, substantially as and for the purposes herein set forth.

2. The coupling-arm consisting of the two parts J J', swiveled together, one part being hinged to the frame and the other to the finger-bar, in combination with the lever K and rod m, thus enabling the operator to rock or tilt the finger-bar, substantially as herein set forth.

3. The combination, with the coupling-arm J J', constructed as set forth, of the finger-bar I, levers L K, rod m, and chain n, as and for the purposes described.

4. In combination with the hinged finger-bar I, the hinged rod P, slotted guide p, and pin t, as and for the purposes set forth.

5. The combination of the finger-bar I, divided, hinged, and swiveled coupling-arm J J', hinged rod P, guide p, and pin t, substantially as and for the purposes herein set forth.

In testimony that we claim the foregoing as our own we affix our signatures in presence of two witnesses.

GEO. S. WHITE.
GEO. W. CALEF.

Witnesses:
IBROOK E. CLAPP,
NELSON E. WHIDDER.